United States Patent [19]

Gerdau et al.

[11] Patent Number: 4,931,513

[45] Date of Patent: Jun. 5, 1990

[54] POLYMERIC HYDRIDOSILAZANES AND PROCESSES FOR THEIR PREPARATION AND THEIR USE

[75] Inventors: Thomas Gerdau, Eppstein/Taunus; Hans-Jerg Kleiner, Kronberg/Taunus; Marcellus Peuckert; Martin Brück, both of Hofheim am Taunus; Fritz Aldinger, Rodenbach, all of Fed. Rep. of Germany

[73] Assignee: Hoechst Aktiengesellschaft, Frankfurt am Main, Fed. Rep. of Germany

[21] Appl. No.: 247,933

[22] Filed: Sep. 22, 1988

[30] Foreign Application Priority Data

Oct. 6, 1987 [DE] Fed. Rep. of Germany ....... 3733728

[51] Int. Cl.$^5$ ............................................ C08F 283/00
[52] U.S. Cl. .................................... 525/474; 528/10; 528/33; 501/92
[58] Field of Search ..................... 525/474; 528/10, 33

[56] References Cited

U.S. PATENT DOCUMENTS

| | | |
|---|---|---|
| 4,397,828 | 8/1983 | Seyferth et al. . |
| 4,482,669 | 11/1984 | Seyferth et al. . |
| 4,540,803 | 9/1985 | Cannady . |
| 4,543,344 | 9/1985 | Cannady . |
| 4,595,775 | 6/1986 | Arkles . |
| 4,720,532 | 1/1988 | Seyferth et al. ..................... 525/474 |
| 4,725,660 | 2/1988 | Serita et al. ......................... 528/28 |
| 4,771,118 | 9/1988 | Takamizawa et al. ............... 528/28 |

OTHER PUBLICATIONS

R. R. Wills et al., *Amer. Ceram. Soc. Bull.*, 62, 904–911, 915 (1983).

*Primary Examiner*—Melvyn I. Marquis

[57] ABSTRACT

The invention relates to novel polymeric hydridosilazanes, processes for their preparation and their use for the preparation of ceramic material containing silicon nitride. To prepare the polymeric hydridosilazanes, polymeric hydridochlorosilazanes are reacted with $NH_3$. To prepare the ceramic material containing silicon nitride, the polymeric hydridosilazanes are then pyrolyzed.

10 Claims, No Drawings

POLYMERIC HYDRIDOSILAZANES AND PROCESSES FOR THEIR PREPARATION AND THEIR USE

DESCRIPTION

The present invention relates to novel polymeric hydridosilazanes, processes for their preparation and their use for the preparation of ceramic material containing silicon nitride, and to this material itself.

Silicon nitride is of considerable commercial interest because of its high temperature stability, its low coefficient of thermal expansion, its extreme hardness coupled with its weight and its high corrosion resistance. It is known that silicon nitride can be prepared by nitriding silicon with $N_2$ or $NH_3$ and by reaction of $SiCl_4$ with $NH_3$ and subsequent pyrolysis. However, pure silicon nitride powder has no sintering activity, so that only very simple moldings can be produced in this way, with major expenditure. Fibers and films can be produced by powder metallurgy only for few fields of use. It is known, however, that layers of silicon nitride which can be used in the semiconductor industry can be formed by gas phase deposition of $SiCl_4$-$NH_3$ or $SiH_4$-$NH_3$.

However, those processes in which shaping takes place at the stage of a pre-ceramic polymer have production advantages. This particularly applies to surface coatings and fiber spinning processes. The actual ceramic is then only prepared by subsequent pyrolysis of the shaped polymer. Polysilazanes are suitable starting material for silicon nitride. The pyrolysis of polysilazanes to give ceramic material containing silicon nitride/SiC has already been described in the literature (R.R. Wills et al., Ceramic Bulletin, volume 62, (1983), 904-915).

Chlorosilazanes are as a rule used as starting materials for the preparation of polysilazanes, these chlorosilazanes being reacted with ammonia or primary or secondary amines (U.S. Pat. No. 4,540,803, U.S. Pat. No. 4,543,344, U.S. Pat. No. 4,595,775, U.S. Pat. No. 4,397,828 and U.S. Pat. No. 4,482,669).

The present invention provides novel starting materials for ceramic materials containing silicon nitride, in particular substantially chlorine-free polymeric hydridosilazanes, also called "polyhydridosilazanes" below.

The present invention relates to a process for the preparation of polymeric hydridosilazanes, which comprises reacting polymeric hydridochlorosilazanes of the formula

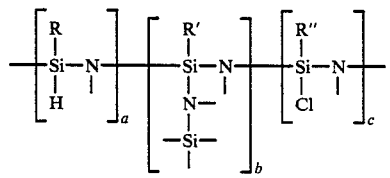

in which the free valencies of the nitrogen atoms are saturated with H atoms or silyl radicals R*SiX-N<(X=H, Cl or N<) and in which R, R', R" and R* denote alkyl groups with 1 to 6, preferably 1 to 3, carbon atoms and a, b and c denote the molar fractions of the particular structural units, with $NH_3$. Particularly preferably, $R=$, $R'=$, $R"=R*=CH_3$.

The polymeric hydridochlorosilazanes used as starting substances, also called "polyhydridochlorosilazanes" below, can be obtained by reacting oligohydridoalkylsilazanes of the general formula $(R^1SiHNH)_n$, in which n is about 3 to 12 and $R^1$ denotes an alkyl group having 1 to 6 carbon atoms, with a dichlorohydridoalkylsilane of the general formula $R^2SiHCl_2$, in which $R^2$ denotes an alkyl group having 1 to 6 carbon atoms, at 30 to 300° C. Highly volatile by-products are thereby formed. These are removed during the reaction.

The oligohydridoalkylsilazanes $(R^1SiHNH)_n$ required as starting substances for the polyhydridochlorosilazanes can in turn be obtained by reacting a dichlorohydridoalkylsilane of the general formula $R^1SiHC_2$, in which $R^1$ has the above meaning, with excess $NH_3$ in a solvent, as described in U.S. Pat. No. 4,482,669 (see, in particular, columns 4, 5, 7 and 8 therein). A mixture of linear and cyclic oligomers with different chain lengths n is in general formed in this reaction.

The radicals $R^1$ and $R^2$ in the oligohydridoalkylsilazanes $(R^1$-$SiHNH)_n$ (also called "oligosilazanes" for short below) or in the dichlorohydridoalkylsilane $R^2HCl_2$ (also called "dichloroalkylsilane" for short below) can be identical or different and preferably have 1 to 3 carbon atoms.

Particularly preferably, $R^1 = R^2 = CH_3$. The molar ratio of the reactants in the above reaction of dichloroalkylsilane: $R^1SiHNH$ unit of the oligosilazane is preferably about 0.2:1 to 1.5:1, in particular 0.3:1 to 1:1.

To react the reactants with one another, the oligosilazanes are preferably initially introduced and the dichloroalkylsilane is added. Since the reaction is exothermic, the temperature is preferably initially kept at 30 to 50° C. when the reactants are brought together. The mixture is then heated to temperatures of 100 to 300° C., preferably to 120 to 250° C.

The low-boiling components formed as by-products in the preparation of the polyhydridochlorosilazanes, such as $RSiHCl_2$, $RSiClH_2$, $RSiCl_3$, HCl, $H_2$ and $NH_3$ (in which $R = R^1$ or $R^2$) partly escape during the reaction. When the reaction has ended, the remaining low-boiling components are in general removed from the reaction vessel by application of a vacuum.

The majority of the $NH_4Cl$ also formed in this reaction sublimes out of the reaction mixture in the course of the reaction. Any remaining residue of $NH_4Cl$ can be removed from the polymeric hydridochlorosilazane by extraction with an inert organic solvent, such as n-hexane, toluene or ether.

The duration of the reaction depends on the heating rate and the reaction temperature. A reaction time of 5 to 7 hours is in general sufficient.

It is also possible to prepare the polyhydridochlorosilazanes in an organic solvent. Suitable solvents are those which are inert towards the reactants and have a sufficiently high boiling point, that is to say, for example, saturated aliphatic or aromatic hydrocarbons, such as n-decane, decalin, xylene or toluene, chlorinated hydrocarbons, such as chlorobenzene, or ethers, such as dibenzyl ether or diethylene glycol diethyl ether. If a solvent in which $NH_4Cl$ formed is insoluble is used, the latter can be removed by filtration. The polymeric hydridochlorosilazanes are then obtained by distilling off the solvent under reduced pressure.

If appropriate, the process can also be carried out under reduced pressure. It can also be carried out under pressures in the range from 1 to 10 atmospheres.

The preparation of the polyhydridochlorosilazanes can also be carried out continuously.

The present invention accordingly also relates to a process for the preparation of polymeric hydridosilazanes, which comprises reacting polmeric hydridochlorosilazanes with NH3, the polymeric hydridochlorosilazanes being obtained by reacting oligohydridoalkylsilazanes of the general formula $(R^1SiHNH)_n$, in which n is about 3 to about 12 and $R^1$ denotes an alkyl group having 1 to 6 carbon atoms, with a dichlorohydridoalkylsilane of the general formula $R^2SiHCl_2$, in which $R^2$ denotes an alkyl group having 1 to 6 carbon atoms, at 30 to 300° C.

The polymeric hydridochlorosilazanes used as the starting substances have a molecular structure which can be represented by the formula

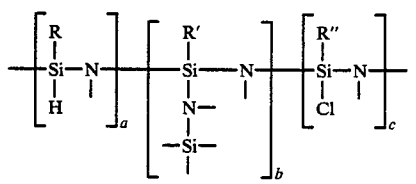

(I)

in which the free valencies on the nitrogen atoms are satured with H atoms or silyl radicals R*SiX-N<(X=H, Cl or N<). In this formula, R, R', R" and R* denote alkyl groups having 1 to 6, preferably 1 to 3, carbon atoms and a, b and c denote the molar fractions of the particular structural units. a +b +c =1. Particularly preferably, R =R'=R"=R* =CH3. The polymeric hydridochlorosilazanes have a network-like structure.

The values of the molar fractions b and c are higher (and the value of a is correspondingly lower) the higher the ratio of dichloroalkylsilane: $R^1SiHNH$ unit of the oligosilazane. The particular values of a, b and c present can be determined by integration of the $^1H$ NMR spectra and by elemental analysis. The value a, b and c are in general 0.1 to 0.8, and a +b +c =1. Preferred polymeric hydridochlorosilazanes are those in which the values for a and b are 0.1 to 0.5, in particular 0.2 to 0.4. The preferred values for c are 0.1 to 0.6, in particular 0.3 to 0.6. As mentioned, these values can be adjusted via the relative content of the dichloroalkylsilane in the reaction mixture and monitored via the analytical methods mentioned. The preferred values also mentioned for a, b and c have proved to be particularly suitable if a fiber is to be produced as the end product of the pyrolysis (after conversion of the polymeric hydridochlorosilazanes into polyhydridosilazanes).

The polymeric hydridochlorosilazanes are converted into polyhydridosilazanes by reaction with ammonia ("ammonolysis"), and these can in turn be converted into ceramic material containing silicon nitride by pyrolysis.

The ammonolysis can be carried out in liquid NH3. However, it is advantageous to carry it out in an organic solvent. All solvents which are inert towards the polyhydridochlorosilazanes are suitable. Preferred solvents are those in which the ammonium chloride obtained as a byproduct has a low solubility and can easily be separated off, for example ethers, aliphatic and aromatic hydrocarbons and chlorinated hydrocarbons. The reactants can be fed into the reaction vessel in any desired sequence during the ammonolysis. However, it is usually advantageous to initially introduce the polyhydridochlorosilazane in solution and to introduce gaseous ammonia or add liquid ammonia. The ammonolysis is preferably carried with excess NH3, to ensure that the reaction is complete and the end products are substantially free from chlorine as far as possible. In general, twice the stoichiometric amount is sufficient for this purpose. If the polyhydridochlorosilazanes have been prepared in a suitable organic solvent, the ammonolysis can be carried out in this solvent without prior removal of the NH4Cl.

The reaction is in general carried out at a temperature of about −50 to +100° C., preferably at −20 to +30° C. and in particular at room temperature (the mixture being cooled with ice). However, it is also possible to carry out the reaction above room temperature, for example at the boiling point of the solvent used, or below room temperature, for example at −33° C. if liquid NH3 is used.

When the ammonolysis has ended, the excess NH3 is removed, if appropriate, and the ammonium chloride obtained is filtered off. To increase the yield, the precipitate can be washed with one of the abovementioned organic solvents. After the solvent has been distilled off under reduced pressure, the polyhydridosilazanes according to the invention are obtained directly as white powders. The polyhydridosilazanes are soluble in the above organic solvents, so that these can be used both for containing surfaces and for production of fibers.

Reactions (familiar from the reactions of chlorosilanes with NH3) of the chlorine-containing structural unit of the polyhydridochlorosilazanes occur during ammonolysis of the polyhydridochlorosilazanes for the formula I

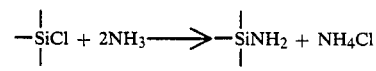

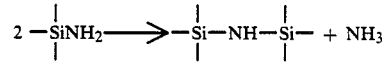

substantially chlorine-free polyhydridosilazanes being formed.

The present invention accordingly also relates to polymeric hydridosilazanes of the formula

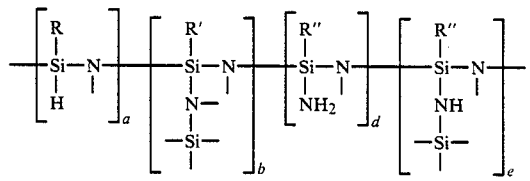

in which the free valencies of the nitrogen atoms are saturated with H atoms or silyl radicals R*SiX-N<(X=H, Cl or N<), and in which R, R', R" and R* denote alkyl groups having 1 to 6, preferably 1 to 3, carbon atoms and a, b, d, and e denote the molar fractions of the particular structural units. In this formula a+b+d+e=1. The case where R=R'=R"=R*=CH$_3$ is particularly preferred.

The invention furthermore relates to polymeric hydridosilazanes which are prepared by reacting polymeric hydridochlorosilazanes with NH$_3$, the polymeric hydridochlorosilazanes being obtained by reacting oligohydridoalkylsilazanes of the general formula (R$^1$SiHNH)$_n$, in which n is about 3 to about 12 and R$^1$ denotes an alkyl group having 1 to 6 carbon atoms, with a dichlorohydridoalkylsilane of the general formula R$^2$SiHCl$_2$, in which R$^2$ denotes an alkyl group having 1 to 6 carbon atoms, at 30 to 300° C. R$^1$ and R$^2$ are preferably alkyl groups having 1 to 3 carbon atoms, and particularly preferably R$^1$ =R$^2$ =CH$_3$.

The polyhydridosilazanes obtained have a high content of N atoms and can be pyrolysed by pyrolysis in an inert nitrogen or argon atmosphere at temperatures of 800 to 1,200° C. to amorphous dense materials which contain silicon nitride and can also contain traces of H and 0. At pyrolysis temperatures above 1,200° C., for example in the range from 1,200° C. to 1,400° C., partly amorphous, microcrystalline ceramic materials which contain α-silicon nitride as the crystalline phase are formed.

It is a particular advantage that the polyhydridosilazanes can be shaped to three-dimensional shaped articles by various processes before the pyrolysis. The invention thus also relates to a process for the preparation of ceramic materials containing silicon nitride, which comprises pyrolysing polymeric hydridosilazanes in an inert nitrogen or argon atmosphere at 800 to 1,400° C., the polymeric hydridosilazanes having been obtained by one of the processes described.

An important method of shaping is drawing of fibers. Specifically, fibers can be drawn from highly viscous solutions of the polyhydridosilazane in solvents, such as toluene, tetrahydrofuran or hexane. The fibers are advantageously drawn by means of spinnerettes 80 to 150 μm in diameter. The threads are narrowed by subsequent stretching, so that a very solid thread of 2 to 20 μm, in particular 5 to 15 μm, in diameter is formed after the pyrolysis. The thread is then dried in air or an inert gas. The fibers produced by subsequent pyrolysisis are used as mechanical reinforcing inclusions in fiber-reinforced aluminum, aluminum alloys and ceramic components.

Another important processing possibility of the polyhydridosilazanes is the production of dense, firmly adhering amorphous or microcrystalline ceramic coatings on metals, in particular steels, or on ceramics, such as Al$_2$O$_3$, ZrO$_2$, MgO, SiC or silicon nitride. Coating is carried out with the aid of a solution of the polyhydridosilazane in organic solvents, such as toluene, tetrahydrofuran or hexane. The pyrolytic conversion into an amorphous or microcrystalline layer is carried out in the same temperature range of 800 to 1,200° C. or 1,200 to 1,400° C. under an inert gas as described above for three-dimensional shaped articles.

Because of their outstanding adhesion, good hardness and surface quality, the ceramic coatings are particularly suitable for surface-finishing of machine components exposed to mechanical and chemical stresses.

The polyhydridosilazanes described above can also be pyrolysed in an NH$_3$ atmosphere instead of an inert gas with an equivalent ceramic yield of 70 to 90%. The result is a glass-clear colorless material which is practically free from carbon. On pyrolysis in NH$_3$ at 1,000° C. or more, the carbon content is less than 0.5% by weight. Depending on the pyrolysis temperature, the pyrolysis product consists of practically pure amorphous silicon nitride (pyrolysis below 1,200° C.) or crystalline silicon nitride (pyrolysis above 1,250 and preferably above 1,300° C.). The pyrolysis in NH$_3$ can be used on all the shaped articles produced by the shaping processes described above, that is to say articles, fibers and coatings formed from polyhydridosilazane powder.

EXPERIMENTAL REPORT

Preparation of polymeric hydridochloromethylsilazane 88g (0.77 mol) of methyldichlorosilane were added to 54.4 g (0.92 mol) of oligohydridomethylsilazane (prepared from 132 g of methyldichlorosilane and NH$_3$ in tetrahydrofuran) at 28 to 46° C. and the mixture was heated to 200° C. in an oil bath in the course of 5 hours. When the reaction had ended, highly volatile reaction products were stripped off at 150° C. under 0.5 bar. The residue which remained was dissolved in 200 ml of n-pentane, the small amount of NH$_4$Cl was filtered off and the filtrate was evaporated to dryness in vacuo. 57.2 g of a soluble white powder consisting of polymeric hydridochloromethylsilazane remained.

EXAMPLE 1

57.2 g of the polymeric hydridochloromethylsilazane prepared according to the experimental report were dissolved in 400 ml of tetrahydrofuran and NH$_3$ was introduced at −5 to 0° C. until saturation was reached. When the ammonolysis had ended, the mixture was stirred at room temperature for 1 hour and the ammonium chloride which had precipitated was filtered off. The solvent and excess NH$_3$ were then stripped off in vacuo. 52.0 g of a white powder which is soluble in organic solvent and has the chemical composition C$_1$H$_4$N$_{1.17}$Si$_1$ remained.

Elemental analysis (% by weight): 25.8% of N; 44% of Si; less than 0.3% of Cl.

Molecular mass: 2,700 g/mol, determined by osmometry in benzene.

$^1$H NMR: (100 MHz, CDC$_3$, ppm): δ0.05–0.6 (br, 3H, SiCH$_3$), 0.7–1.4 (br, 0.6H, NH), 4.3–4.5 (br) and 4.6–5.0 (br, 0.38H, SiH).

IR: (KBr, cm$^{-1}$) 3480 (w), 3400 (m), 2960 (sh, m), 2140 (br, m), 1410 (w), 1260 (5h, s), 1150 br, m), 1050–960 (br, s), 900 (vs), 755 (br, m).

EXAMPLE 2

The polyhydridomethylsilazane was prepared directly from the oligohydridomethylsilazane (CH$_3$SiNNH)$_n$ without the polyhydridochloromethylsilazane intermediately formed being isolated:

9.56 g (162 mmol) of oligohydridomethylsilazane and 15.6 g (135 mmol) of dichloromethylsilane were heated under reflux at an oil bath temperature of 235° C. for 4 hours. The low-boiling constituents were then stripped off at 80° C. in vacuo and the residue was dissolved in 50 ml of tetrahydrofuran. NH$_3$ was passed in at −5 to 0° C. and the NH$_4$Cl was filtered off when the reaction had ended. After the solvent had been stripped off, 7.1 g of a white powder consisting of polyhydridomethylsilazane remained.

Elemental analysis (% by weight): 42% of Si; 21.7% of N; 0.6% of Cl.

EXAMPLE 3

The polyhydridomethylsilazane prepared in Example 1 was heated up to 1,000° C. in an argon atmosphere in the course of 4 hours and was pyrolysed at 1,000° C. for 1 hour. A ceramic material which is amorphous under X-rays and contains 22.2% by weight of N, 4.1% by weight of C and 8.5% by weight of O was obtained in a yield of 85% by weight.

EXAMPLE 4

The polyhydridomethylsilazane prepared in Example 1 was dissolved in toluene so that a highly viscous concentrated solution was formed. Fibers were drawn from this solution with the aid of a glass rod and after drying in argon were pyrolysed at 1,000° C. in an argon atmosphere for 1 hour. Pore-free fibers which are amorphous in X-rays and have diameters of 20 μm were thereby obtained.

We claim:

1. A process for the preparation of a polymeric hydridosilazane, which comprises reacting a polymeric hydridochlorosilazane of the formula

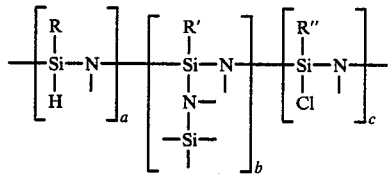

in which the free valencies of the nitrogen atoms are saturated with H atoms or silyl radicals of the formula R*SiXN<[(X=H, Cl or N<)], wherein X is H, Cl, or N<, and which R, R', R" and R* denote alkyl groups with 1 to 6 carbon atoms and wherein a, b and c denote the molar fractions of the particular structural units and wherein the value of a, b, and c are each between 0.1 and 0.8 with $NH_3$.

2. The process as claimed in claim 1, wherein R =R'=R"=R* =$CH_3$.

3. A process for the preparation of a polymeric hydridosilazane, which comprises reacting a polymeric hydridochlorosilazane with $NH_3$, the polymeric hydridochlorosilazane being obtained by reacting an oligohydridoalkylsilazane of the general formula $(R^1SiHNH)_n$, in which n is about 3 to about 12 and $R^1$ denotes an alkyl group having 1 to 6 carbon atoms, with a dichlorohydridoalkylsilane of the general formula $R^2SiHCl_2$, in which $R^2$ denotes an alkyl group having 1 to 6 carbon atoms, at 30 to 300° C.

4. The process as claimed in claim 3, wherein $R^1$ =$R^2$ =$CH_3$.

5. A polymeric hydridosilazane of the formula

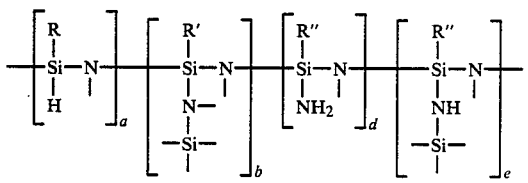

in which the free valencies of the nitrogen atoms are saturated with H atoms or silyl radicals R*SiXN<- wherein X is H, Cl or N<, and in which R, R', R" and R* denote alkyl groups having 1 to 6 carbon atoms and a, b, d and e denote the molar fractions of the particular structural units.

6. A polymeric hydridosilazane as claimed in claim 5, wherein R =R'=R"=R* =$CH_3$.

7. A polymeric hydridosilazane, obtainable by the process as claimed in claim 1.

8. A polymeric hydridosilazane, obtainable by the process as claimed in claim 2.

9. A polymeric hydridosilazane, obtainable by the process as claimed in claim 3.

10. A polymeric hydridosilazane, obtainable by the process as claimed in claim 4.

* * * * *